United States Patent Office 3,454,549
Patented July 8, 1969

3,454,549
DESAMINO¹-ARGININE⁸-VASOPRESSIN
Roger Boissonnas, Bottmingen, and Rene Huguenin, Reinach, Basel-Land, Switzerland, assignors to Sandoz Ltd. (also known as Sandoz A.G.), Basel, Switzerland
No Drawing. Filed July 1, 1965, Ser. No. 468,971
Claims priority, application Switzerland, July 17, 1964, 9,387/64
Int. Cl. C07c *103/52;* A61k *25/00*
U.S. Cl. 260—112.5       1 Claim

ABSTRACT OF THE DISCLOSURE

The compound desamino¹-Arg⁸-vasopressin, which differs from the natural human vasopressin, Arg⁸-vasopressin because of the replacement of the terminal amino group with a hydrogen atom, exhibits an antidiuretic activity more than three times the activity of the natural human vasopressin. The pressor effect is somewhat lower than the pressor effect of the natural product.

---

The present invention relates to a new polypeptide and a process for its production.

The present invention provides the polypeptide of Formula I, is oxidized in manner known per se and subsequently the resulting polypeptide I is optionally converted into its acid addition salts with organic or inorganic acids in manner known per se.

The oxidation of the polypeptide V to give the desired final product I is preferably effected with hydrogen peroxide, potassium ferricyanide or 1,2-diiodoethane in aqueous or aqueous organic solution at a pH value of from 4 to 9. An aqueous alcoholic solution or a mixture of acetone and water may, for example, be used as the aqueous organic solution.

The polypeptide V may be obtained by splitting off the protective radicals R' and R" in one or more stages from an octapeptide derivative of general Formula IV (in column 3), in which R' denotes a radical capable of protecting a sulfhydryl radical in peptide synthesis, and
R" denotes a radical capable of protecting a guanido radical in peptide synthesis.

The octapeptide derivative IV may be obtained by known methods for the synthesis of peptides, it being possible to join together the amino acid and β-mercaptopropionic acid in the order indicated in general Formula IV one at a time or by first forming constituent peptide units and joining these together.

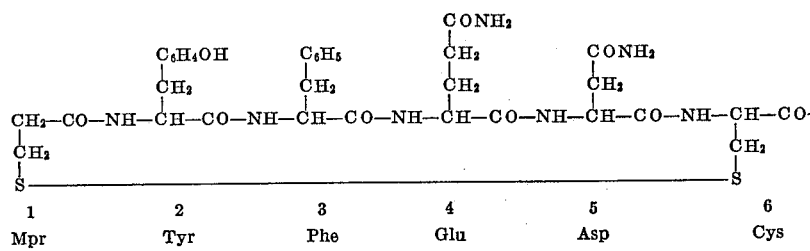

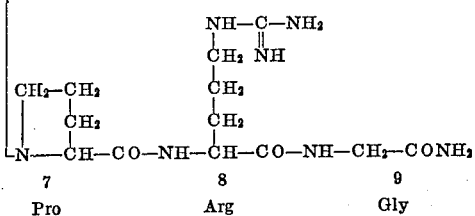

I and its acid addition salts.

The present invention further provides a process for the production of Compound I and its acid addition salts, characterized in that a polypeptide of Formula V, The term "known methods" as utilized herein designates methods in use or described in the literature on the subject.

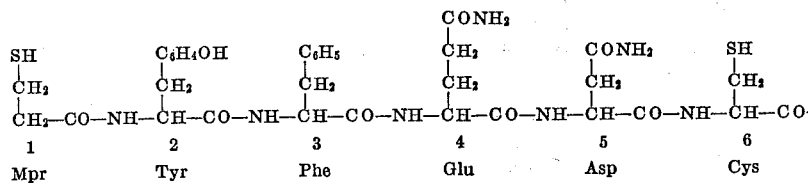

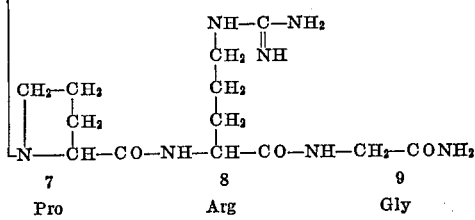

V

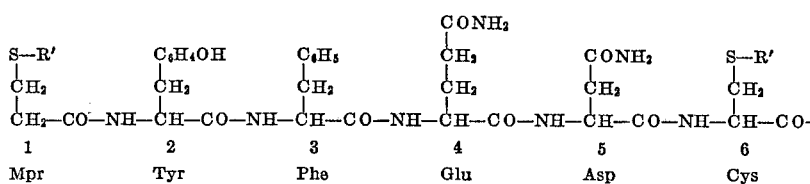

IV

The octapeptide derivative IV may, for example, be produced in that a hexapeptide derivative of general Formula II,

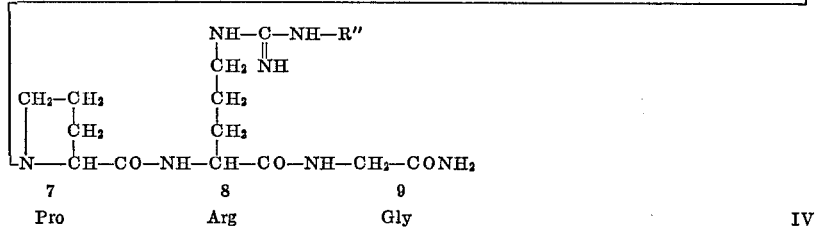

in which

R' and R" have the above significance, is condensed with a reactive derivative of a free acid of general Formula III,

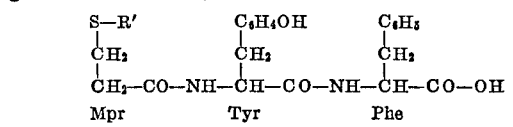

—Mpr—=β-mercaptopropionyl— in which

R' has the above significance.

Examples of radicals for protecting the sulfhydryl radical in the above process by temporarily blocking it are the benzyl or p-xylyl radicals, which examples of radicals for protecting the guanido raidcal are the p-toluenesulfonyl or benzenesulfonyl radicals.

It should be noted that the octapeptide derivative IV need not be produced in the manner described above as it may also be produced by condensation of two polypeptides other than the ones indicated above (or a polypeptide and an amino acid) in the form of their protected derivatives, or an octapeptide and β-mercaptopropionic acid in the form of their protected derivatives.

Compound I, which may be called Desamino¹-Arg⁸-vasopressin, has an antidiuretic effect which is considerably stronger than that of natural human vasopressin, Arg⁸-vasopressin of Formula VI,

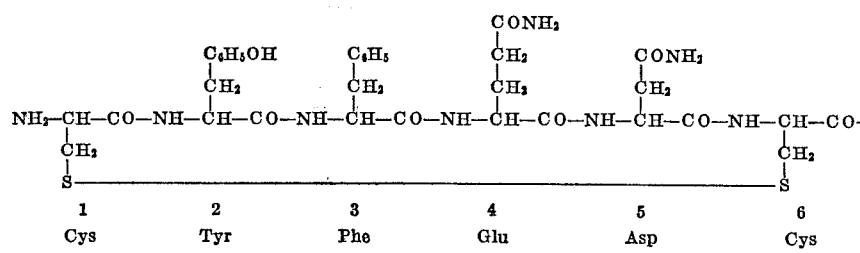
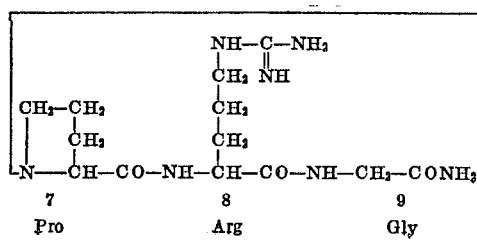

VI from which the new compound differs in that it does not have an α-amino radical at one end of the peptide chain.

With its antidiuretic effect of 1300 I.U./mg. Desamino[1]-Arg[8]-vasopressin is the most effective hitherto known compound in the field of polypeptide hormones of the posterior lobe of the hypophysis.

Upon comparing the effects expressed in International Units (I.U.) it may be seen that natural arginine vasopressin has a pressoric effect which is as strong as its antidiuretic effect, whereas Compound I has a pressoric effect which amounts to only approximately one-fourth of its antidiuretic effect. The antidiuretic effect in comparison with the pressoric effect is therefore more selective in Compound I than in natural arginine vasopressin.

|  | Antidiuretic effect in I.U./mg. | Pressoric effect in I.U./mg. |
| --- | --- | --- |
| Desamino[1]-Arg[8]-vasopressin (compound I) | 1,300 | 370 |
| Arg[8]-vasopressin | 400 | 400 |

Compound I is especially indicated for use in the treatment of diabetes insipidus, certain cases of hypotonia, collapse and shock conditions. The higher degree of action and the greater stability of the new Compound I in comparison with arginine vasopressin are especially advantageous.

The improved antidiuretic effect of Compound I in comparison with arginine vasopressin could, therefore, not be foreseen, since it is known that the removal of the terminal amino radical of lysine vasopressin only alters the antidiuretic properties of this hormone very slightly. The dosage of Compound I should be adapted to the individual degree of hormone deficiency which may vary considerably and has a range of 5 to 15 I.U. administered 3 to 4 times daily subcutaneously or intramuscularly.

The polypeptide of the invention may be used in the form of free base or salt of an organic or inorganic acid or an acid radical containing polymer (e.g. alginic acid, carboxymethyl cellulose, tannic acid), either as pharmaceutical on its own or in the form of appropriate medicinal preparations, e.g. for oral, parenteral, enteral or intranasal administration. In order to produce suitable medicinal preparations the compounds are worked up with inorganic or organic adjuvants which are inert and pharmacologically acceptable. Examples of such adjuvants are:

tablets: lactose, starch, talc and stearic acid;
injectable solutions: water, alcohols, glycerin and vegetable oils;
suppositories: natural or hardened oils and waxes;
intranasal sprays: water, glycerin and other liquid substances tolerated by the mucous membrane.

The preparations may furthermore contain suitable preserving, stabilizing and wetting agents, solubilizers, sweetening and coloring substances and flavorings.

In the following examples all temperatures are indicated in degrees centigrade.

EXAMPLE 1.—POLYPEPTIDE I (a) S-benzyl-β-mercaptopropionic acid 2,4,5-trichlorophenyl ester 20 g. of S-benzyl-β-mercaptopropionic acid and 22 g. of 2,4,5-trichlorophenol are dissolved in 170 cc. of ethyl acetate and 20 ml. of acetonitrile, cooling is effected at −10° and then 21 g. of dicyclohexylcarbodiimide are added. The solution is shaken for 4 hours at room temperature, the dicyclohexylurea precipitate is filtered with suction and the filtrate is evaporated in a vacuum at 30°. The residue is dissolved in ethyl acetate and the solution is washed with aqueous sodium bicarbonate and then with water. After drying over sodium sulfate the ethyl acetate is evaporated. The residue is left to stand at −10° whereby S-benzyl-β-mercaptopropionic acid 2,4,5-trichlorophenyl ester, having a melting point of 17°, crystallizes.

(b) O,N-dicarbobenzoxy-L-tyrosyl-L-phenylalanine methyl ester 47 g. of L-phenylalanine methyl ester in 300 cc. of dimethylformamide are added to 157 g. of O,N-dicarbobenzoxy-L-tyrosine 2,4,5-trichlorophenyl ester. After 16 hours dilution is effected with 600 cc. of ethyl acetate. The resulting precipitate is filtered with suction and washed with ethyl acetate, ether, N hydrochloric acid and water. After drying in a high vacuum at 40° O,N-dicarbobenzoxy-L-tyrosyl-L-phenylalanine methyl ester, having a melting point of 187°, $[\alpha]_D^{22} = -16°$ (dimethylformamide), is obtained.

(c) S-benzyl-β-mercaptopropionyl-L-tyrosyl-L-phenylalanine methyl ester 92 g. of O,N-dicarbobenzoxy-L-tyrosyl-L-phenylalanine methyl ester are dissolved in 900 cc. of anhydrous acetic acid which have been saturated with hydrogen bromide. The solution is left to stand for one hour at 20°, evaporation is effected in a vacuum below 40° and the residue is carefully washed with diethyl ether. The residue is dissolved in 360 ml. of water at 0°, 22 g. of potassium carbonate are added and extraction is effected with ethyl acetate at 0°. After drying over sodium sulfate 55 g. of S-benzyl-β-mercaptopropionic acid 2,4,5-trichlorophenyl ester are added and the mixture is left to stand for 15 hours at 20°. The solution is washed with dilute hydrochloric acid and aqueous sodium bicarbonate, drying is effected over sodium sulfate and the ethyl acetate is evaporated in a vacuum at 30°. The residue is washed with ether/petroleum ether (1:2). After drying in a high vacuum at 40° S-benzyl-β-mercaptopropionyl-L-tyrosyl-L-phenylalanine methyl ester, having a melting point of 149°, $[\alpha]_D^{23} = -18°$ (dimethylformamide), is obtained.

(d) S-benzyl-β-mercaptopropionyl-L-tyrosyl-L-phenylalanine-hydrazide 52 g. of S - benzyl-β-mercaptopropionyl-L-tyrosyl-L-phenylalaniline-methyl ester are dissolved in 260 cc. of anhydrous methanol, 32 cc. of anhydrous hydrazine are added and the mixture is left to stand for 15 hours at 20°. The precipitate is filtered with suction and washed with methanol. After drying in a vacuum at 50° S-benzyl-β - mercaptopropionyl - L - tyrosyl - L - phenylalanine-hydrazide, having a melting point of 253°, $$[\alpha]_D^{22} = -17°$$

(0.3 N HCl in 96% acetic acid), is obtained.

(e) S - benzyl - β - mercaptopropionyl - L - tyrosyl-L - phenylalanyl - L - glutaminyl - L - asparaginyl-S - benzyl - L - cysteinyl - L - prolyl - G - tosyl-L-arginyl-glycinamide 33 g. of S - benzyl - β - mercaptopropionyl-L-tyrosyl-L - phenylalanine - hydrazide are dissolved in a mixture of 250 ml. of dimethylformamide, 250 ml. of isopropanol and 32 cc. of 6 N hydrochloric acid, cooling is effected at −5° and 13.5 ml. of a 5 N solution of sodium nitrite in water are added whilst stirring. After 5 minutes the resulting solution is poured into 1.6 litres of a 0.25 N solution of sodium bicarbonate in water. The precipitate which forms is filtered with suction, washed with water, dried in a high vacuum at 2° and a solution of 50 g. of L - glutaminyl - L - asparaginyl - S - benzyl - L-cysteinyl-L - proylyl - G - tosyl - L - arginyl - glycinamide in 300 ml. of dimethylformamide is added. The mixture is left to stand for 2 days, 1200 cc. of ethyl acetate are subsequently added and the precipitate is washed with ethyl acetate. After drying at 30° the product is washed with warm methanol. S - benzyl - β - mercaptopropionyl-L- tyrosyl - L - phenylalanyl - L - glutaminyl - L-asparaginyl S - benzyl - L - cysteinyl - L - prolyl - G- tosyl - L - arginyl - glycinamide, having a melting point of 197°, $[\alpha]_D^{22} = -37°$ (dimethylformamide), is obtained.

(f) β - mercaptopropionyl - L - tyrosyl - L - phenylalanyl - L - glutaminyl - L - asparaginyl - L - cysteinyl-L-prolyl-L-arginyl-glycinamide The necessary amount of sodium or potassium metal is added to a solution of 5 g. of S - benzyl - β - mercaptopropionyl - L - tyrosyl - L - phenylalanyl L - glutaminyl-L - asparaginyl - S - benzyl - L - cysteinyl - L - prolyl-G - tosyl - L - arginyl - glycinamide in 1200 cc. of dry, liquid ammonia to give a stable blue coloration. After the addition of 1.5 g. of ammonium chloride the solution is evaporated to dryness. The residue contains β-mercaptopropionyl - L - tyrosyl - L - phenylalanyl-L-glutaminyl - L - asparaginyl - L - cysteinyl - L - prolyl-L-arginyl-glycinamide and may be worked up further as such.

(g) Polypeptide compound I

The residue obtained in (f) above is dissolved in 4 liters of 0.01 N acetic acid and is oxidized at a pH value of 6.5–9.0 by the addition of 7.5 cc. of a N solution of hydrogen peroxide in water. The pH value of the solution is adjusted to 4.5 by the addition of dilute hydrochloric acid and after the addition of 50 g. of sodium chloride or 0.34 g. of methanesulfonic acid or 0.405 g. of trifluoroacetic acid, evaporation to dryness is effected, whereby a dry powder results which keeps well. It may be stored and when used it may be dissolved to give a clear solution. However, the solution may also be used as such, if desired after diluting with water or a salt solution.

For purposes of removing the inorganic salts, the above mentioned solution which has been brought to a pH value of 4.5 may be reduced in volume and subsequently subjected to counter-current distribution in the system *secondary* butanol/water/glacial acetic acid 120:160:1. After 200 transfer stages the substance is present in tubes 38 to 62 with a maximum in tube 50 ($K$=0.33). After evaporation, the active polypeptide is obtained with a good yield in the form of a hygroscopic acetate, with uniform behavior in chromatography and electrophoresis. Migration in paper electrophoresis at a pH value of 5.8 and 40 v./cm.: 30 mm. in 60 minutes (the histidine used as reference migrates 72 mm.). Migration in paper electrophoresis at a pH value of 1.9 and 40 v./cm.: 34 mm. in 60 minutes (the tryptophane used as reference migrates 62 mm.). R*f* in paper chromatography in the system isoamyl alcohol/pyridine/water 35:35:30: 0.27. Total hydrolysis (16 hours, 110°, HCl 6 N) yields the following amino acids in equimolecular quantities: tyrosine, phenylalanine, glutaminic acid, asparaginic acid, proline, arginine and glycine; and the different disulfides of cysteine and β-mercaptopropionic acid. $[\alpha]_D^{23} = -92.5°$ in 0.1 N acetic acid.

EXAMPLE 2

The same procedure as in Example 1 is used, except that final oxidation is effected at 0–35° by the addition of 7.1 cc. of a N solution of potassium ferricyanide in water at a pH value of 5.0–9.0.

EXAMPLE 3

The same procedure as in Example 1 is used, except that final oxidation is effected at 0–35° by the addition of 1.05 g. of 1,2 - diiodoethane dissolved in acetone, at a pH value of 5.5–8.5. After oxidation the excess of 1,2-diiodoethane is extracted with ethyl acetate. The ethyl acetate remaining in the aqueous solution is removed in a vacuum at 20°.

What is claimed is:
1. The polypeptide of formula:

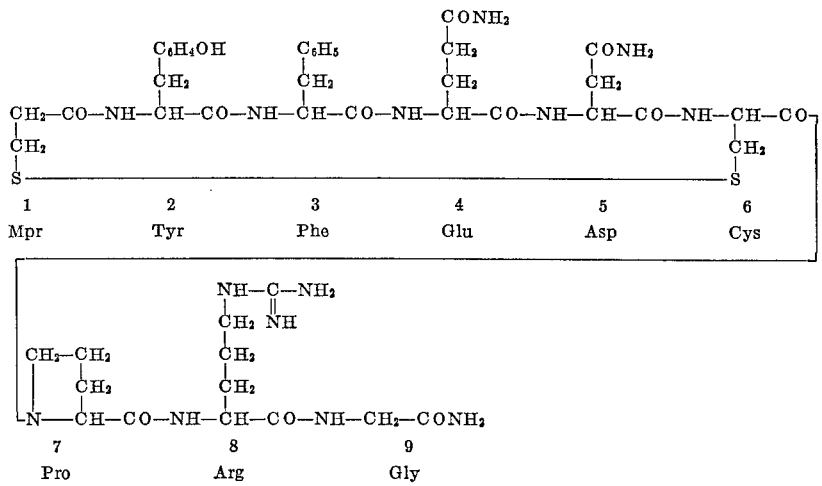

and its physiologically acceptable acid addition salts.

References Cited

Huguenin et al., I, Helv. Chim. Acta. 45 1632–1633 (1962).

Huguenin et al., II, Experientia 21, 68–69. (1965).

Kimbrough et al., J. Biol. Chem. 238, 1411–1413 (1963).

LEWIS GOTTS, *Primary Examiner*.

MELVYN M. KASSENOFF, *Assistant Examiner*.

424—177